United States Patent [19]
Anderson

[11] 3,829,970
[45] Aug. 20, 1974

[54] COMPRESSION SPRING TENSIONER FOR THE BLADE OF PORTABLE ELECTRIC BAND SAW

[75] Inventor: Martin P. Anderson, Milwaukee, Wis.

[73] Assignee: Milwaukee Electric Tool Corporation, Brookfield, Wis.

[22] Filed: Sept. 20, 1973

[21] Appl. No.: 399,264

[52] U.S. Cl.................................. 30/380, 30/274
[51] Int. Cl...................... B27b 13/08, B26b 25/00
[58] Field of Search ................. 30/380, 274; 83/818

[56] References Cited
UNITED STATES PATENTS

| | | | |
|---|---|---|---|
| 2,101,343 | 12/1937 | Ponton | 83/818 |
| 2,596,081 | 5/1952 | Sacrey | 30/380 |
| 2,884,026 | 4/1959 | Krenzke | 83/818 |
| 2,969,815 | 1/1961 | Lasar | 83/818 |

Primary Examiner—Al Lawrence Smith
Assistant Examiner—K. J. Ramsey
Attorney, Agent, or Firm—Michael, Best & Friedrich

[57] ABSTRACT

A compression spring tensioner for the blade of a portable electric band saw has a rotatable blade release lever which upon rotation causes a release shaft with an eccentric crank pin bearing to move a blade tension bar which acting through compression spring means and a spring anchor bar causes the front pulley guard and the front idler pulley to slide. As this unit is slid forward, the blade becomes fully tight and the guard and pulley cannot move further forward. However further rotation of the blade release shaft forces the blade tension bar to compress the compression spring means to apply an accurate predetermined tension to the band saw blade. Furthermore, the eccentric crank pin bearing operates in an overcenter relationship to the blade tension bar to provide a positive means of holding the rotatable blade release lever against a fixed stop to assure that the accurate preload on the band saw blade is maintained under all conditions during usage of the saw.

3 Claims, 5 Drawing Figures

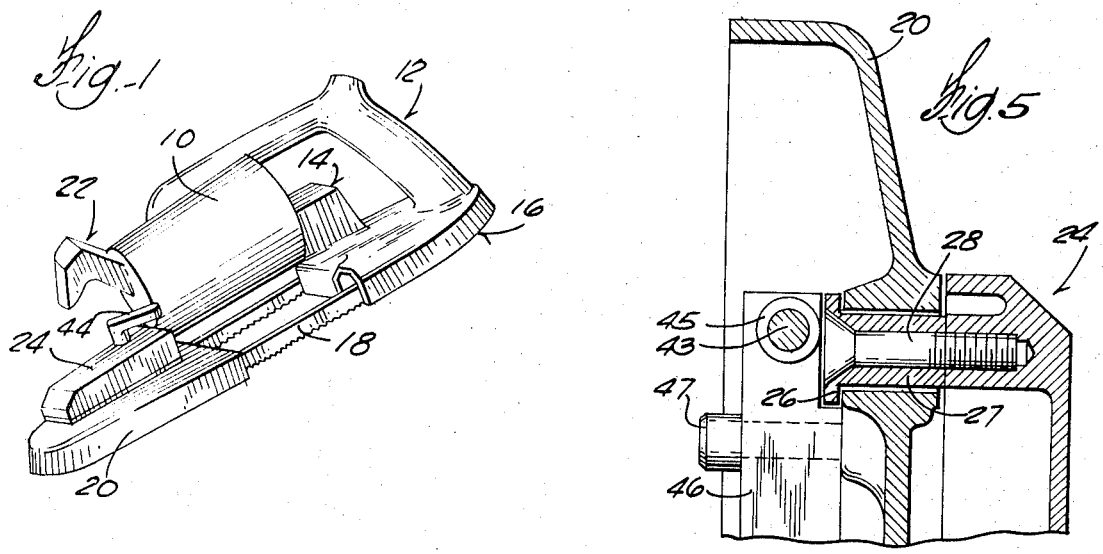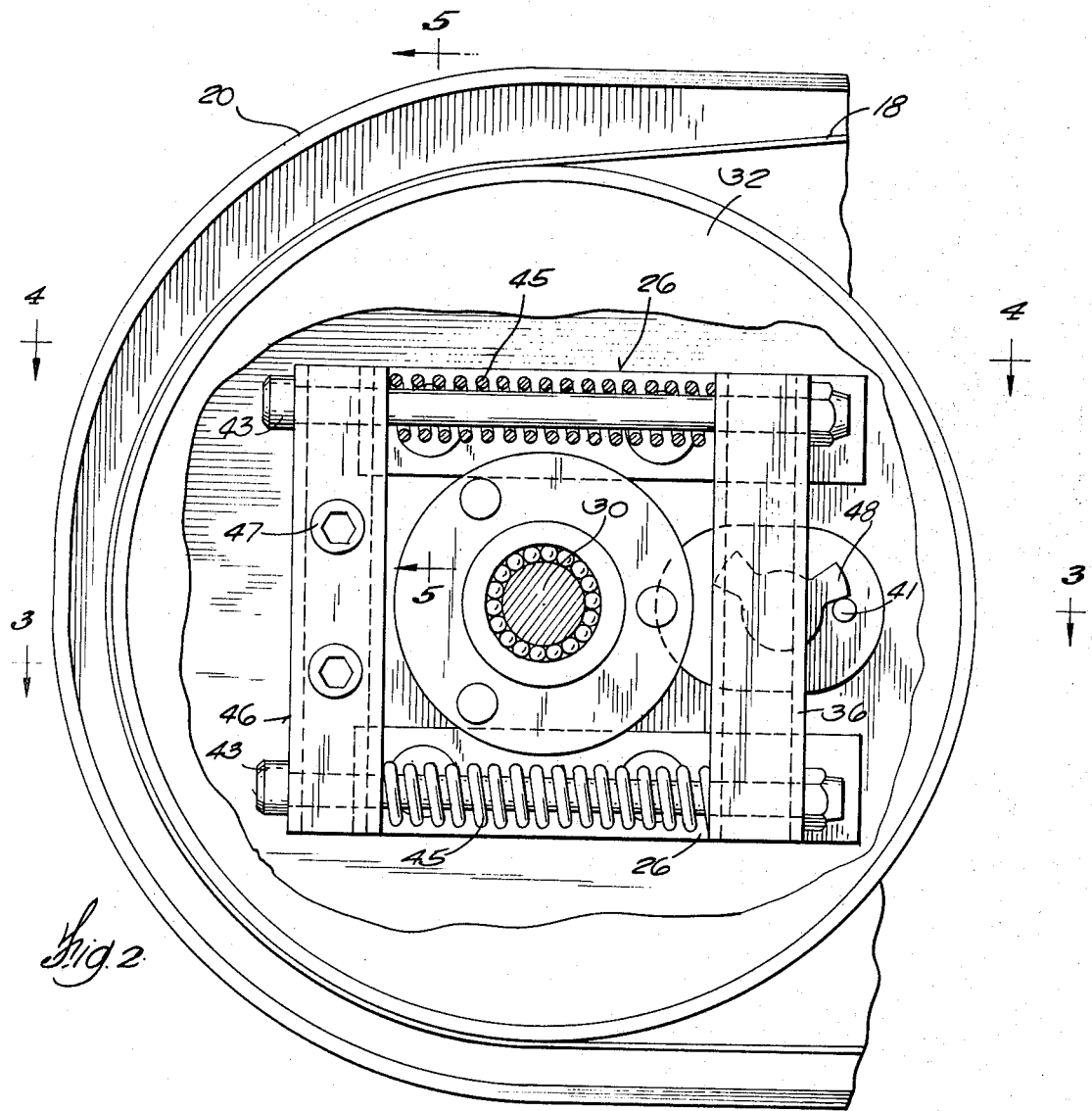

COMPRESSION SPRING TENSIONER FOR THE BLADE OF PORTABLE ELECTRIC BAND SAW

BACKGROUND OF THE INVENTION

1. Field of the Invention

This invention relates generally to a tension maintenance device for the blade of a portable electric band saw. In particular to such device which employs compression spring means which are activated when the blade becomes fully tight.

2. Description of the Prior Art.

Positive screw type tensioners are old in the art, see U.S. Patents:

2,593,760; 2,604,910; 2,722,953; 2,798,518; and 2,806,490.

The use of a U-shaped or hooped spring tending to press the shield and idler pulley radially away from the driving pulley is shown and described in U.S. Pat. No. 2,596,081. There is no available adjustment of the tension of such springs.

The use of adjustable compression springs acting through levers to urge an idler wheel radially outward to provide tension are shown in U.S. Pat. No. 2,625,964. Each spring must be separately adjusted for equalization of tension to prevent imbalance and cocking of the axis of rotation of the idler wheel. This disclosure has no teaching of any readily adjustable tension.

U.S. Pat. No. 2,678,667 also shows an adjustable coiled compression spring which provides tension to a saw chain. There is no disclosure of an eccentric type of easy adjustment.

U.S. Pat. No. 2,690,774 also shows adjustable compression springs which keep a tension on the endless wire with saw teeth. There is no disclosure of an eccentric for readily adjusting the spring lever.

BRIEF DESCRIPTION OF THE DRAWINGS

IN THE DRAWINGS

Figure 3:
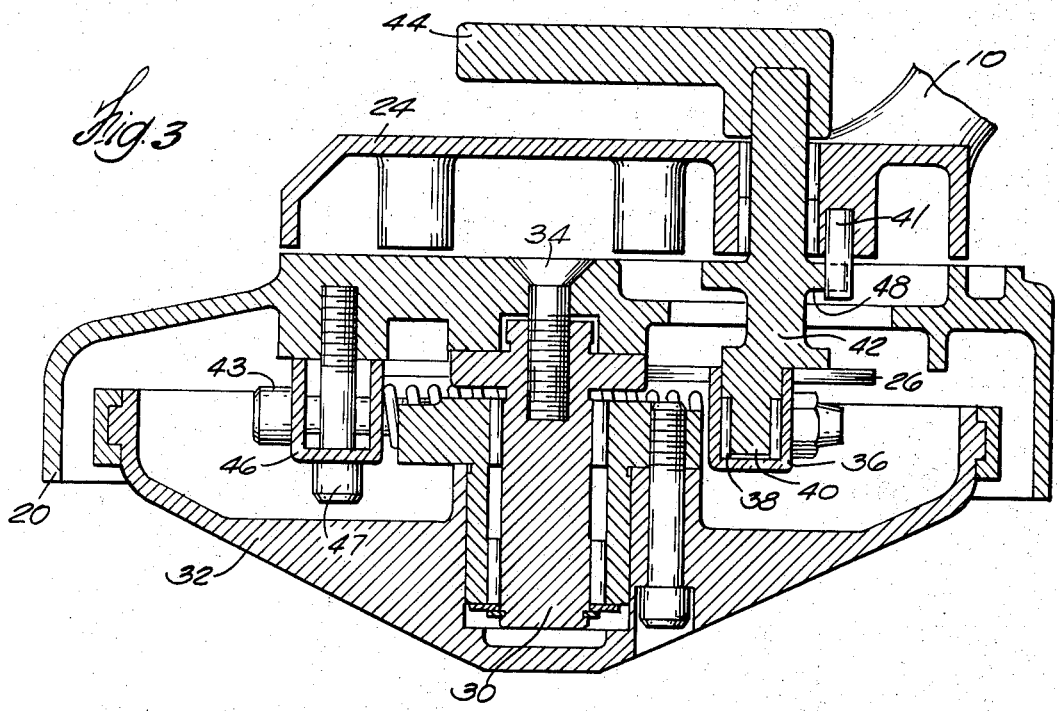
Figure 4:
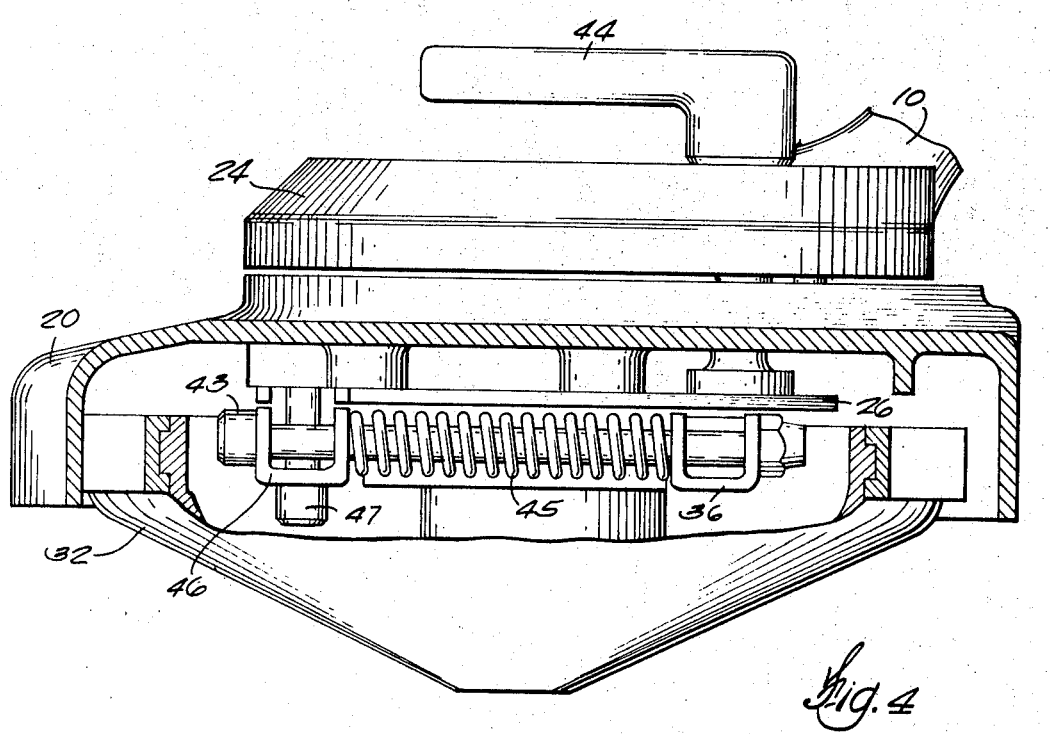

FIG. 1 is a perspective view of a portable electric band saw embodying the present invention;

FIG. 2 is an enlarged fragmentary bottom plan view of the idler pulley and tensioner mechanism embodying the present invention;

FIG. 3 is a sectional view taken on the line 3—3 of FIG. 2;

FIG. 4 is a sectional view taken on the line 4—4 of FIG. 2; and

FIG. 5 is a fragmentary sectional view taken on the line 5—5 of FIG. 2.

DESCRIPTION OF THE PREFERRED EMBODIMENT

Referring to the drawings by reference numerals, there is illustrated for the purpose of describing this invention a compression spring tensioner for the blade of a portable electric band saw. The basic elements of the electric band saw are well known to those skilled in this art; see, Porter-Cable Machine Company of Syracuse, N.Y. Catalogue Form No. A984 of 1953, Rockwell Manufacturing Company of Pittsburgh, Penn. Catalogue PC 1502 of 1967 pages marked D1; and, Greenlee Tool Co. of Rockford, Ill. Bulletin No. E521 of 1968. These elements are generally indicated in FIG. 1 as follows: motor housing 10 including an electric motor; handle 12 with two speed operating switch; gear case 14 including transmission gears; rear drive pulley guard 16 including drive pulley; saw blade 18; front idler pulley guard 20 including idler pulley 32; both front guard and idler pulley being slidably mounted as a unit with respect to the motor housing 10 and the rear drive pulley guard 16; and a front T-shaped handle 22 mounted on the motor housing 10. These well-known basic elements will not therefore be described herein in detail.

The essential features of this invention are the employment of an eccentric crank mechanism which, upon rotation against a postive stop, readily applies accurate predetermined tension to the saw blade through coil type compression springs. After the saw blade is in fully extended position such springs will accommodate changes in length due to manufacturing tolerances, temperature changes and frictional drag in the work piece to provide a continuing uniform frictional drive between the drive pulley and the saw blade. This mechanism is shown in detail in FIGS. 2, 3, 4, and 5.

The front pulley guard 20 is slidably mounted on a forward extention 24 of the motor housing 10 by two pulley guard retaining plates 26 located on four spacers 27 (one of each being shown in FIG. 5) and secured to extension 24 by four machine screws 28. The axle 30 for the idler pulley 32 is rigidly mounted to the pulley guard 20 by a machine screw 34, see FIG. 3. Thus when the pulley guard 20 is slid toward front or rear the idler pulley 32 will also be moved as an intergral part of the assembly.

In order to shaft the idler pulley 32 from a rearward position to a front position, a relatively slidable blade tensioning bar 36, is provided with a bearing slot 38, see FIG. 3. This slot slidably receives an eccentric crank 40 carried by a blade release shaft 42. This shfat is rotated by blade release lever 44 to a fixed stop position which is controlled by lug 48 contacting pin 41 that is rigidly mounted to extension 24 (see FIGS. 2 and 3). The stop pin 41 is located so that eccentric crank 40 stops in an overcenter angular relationship to blade tension bar 36. This provides a positive lock position of tension bar 36 to maintain the preload of blade 18 during all conditions of operation. The blade tensioning bar acts through a pair of coil type compression springs 45 upon a spring anchor bar 46 secured to the pulley guard 20 by screws 47 to move such guard and the idler pulley 32 from a rearward position toward a forward position. As this unit is moved toward forward position such motion will be arrested when the saw blade 18 is fully tightened. Thereafter further movement will add stored energy to the springs 45 to continually maintain an accurate preadjusted tension on the saw blade. The two springs 45 and tension bar 36 are guided and supported by two thru bolts 43.

The use of the eccentric control provides a means that allows a workman to quickly replace a blade on the saw and readily obtain a calibrated blade tension without making adjustments in the field.

I claim:

1. A compression spring tensioner for the blade of a portable band saw comprising:

a. a main housing;

b. a unit consisting of a front idler pulley and pulley guard slidably mounted with respect to said main housing;

c. a blade tensioning member slidably movable relative to said unit, said member having a bearing slot;
d. an anchor member secured to said unit;
e. compression spring means reacting between said blade tensioning member and said anchor member; and
f. an eccentric means for moving said blade tensioning member, said means having a rotatable shaft with an eccentric crank slidable in said slot.

2. A compression spring tensioner for the blade of a portable band saw as defined in claim 1 wherein:
   a. said main housing includes a forward extension; and
   b. said unit is slidably mounted on said extension.

3. A compression spring tensioner for the blade of a portable band saw as defined in claim 2 wherein:
   a. said rotatable shaft is mounted in said forward extension; and
   b. there is blade release lever on the upper end of said rotatable shaft outside said forward extension.

* * * * *